United States Patent

Peppel

[11] 4,301,689
[45] Nov. 24, 1981

[54] TRANSMISSION CONTROL SYSTEM

[75] Inventor: Jon H. Peppel, Horton, Mich.

[73] Assignee: Clark Equipment Company, Buchanan, Mich.

[21] Appl. No.: 974,657

[22] Filed: Nov. 20, 1978

Related U.S. Application Data

[63] Continuation of Ser. No. 779,445, Mar. 21, 1977, abandoned.

[51] Int. Cl.³ .......................... F16H 5/42; F16D 19/00
[52] U.S. Cl. ..................................... 74/336 R; 74/866; 74/732; 192/87.19
[58] Field of Search .................. 74/336 R, 336.5, 866, 74/732; 192/87.12, 103 F, 87.19

[56] References Cited

U.S. PATENT DOCUMENTS

| | | | |
|---|---|---|---|
| 3,334,703 | 8/1967 | Zeller | 74/732 X |
| 3,439,564 | 4/1969 | Scholl et al. | 74/336 R |
| 4,049,101 | 9/1977 | Hattori et al. | 192/87.19 |
| 4,164,876 | 8/1979 | Peppel | 74/336 R |

*Primary Examiner*—C. J. Husar
*Assistant Examiner*—Frank McKenzie
*Attorney, Agent, or Firm*—Mack L. Thomas

[57] ABSTRACT

In a transmission control system for a multiple speed ratio powershift transmission having a speed control valve and a plurality of fluid pressure operated clutches adapted to establish torque ratio changes, an electronic speed sensing system and downshift valve means for automatically shifting the transmission one step from a higher speed ratio to a lower speed ratio at a first predetermined vehicle ground speed by diverting the fluid for pressurizing a higher speed ratio clutch to a lower speed ratio clutch and then automatically shifting the transmission from the lower speed ratio back to the higher speed ratio at a second higher predetermined vehicle ground speed by ceasing the diverting of the pressurized fluid, with the fluid diverting being possible only when the speed control valve setting corresponds with the higher speed ratio.

11 Claims, 5 Drawing Figures

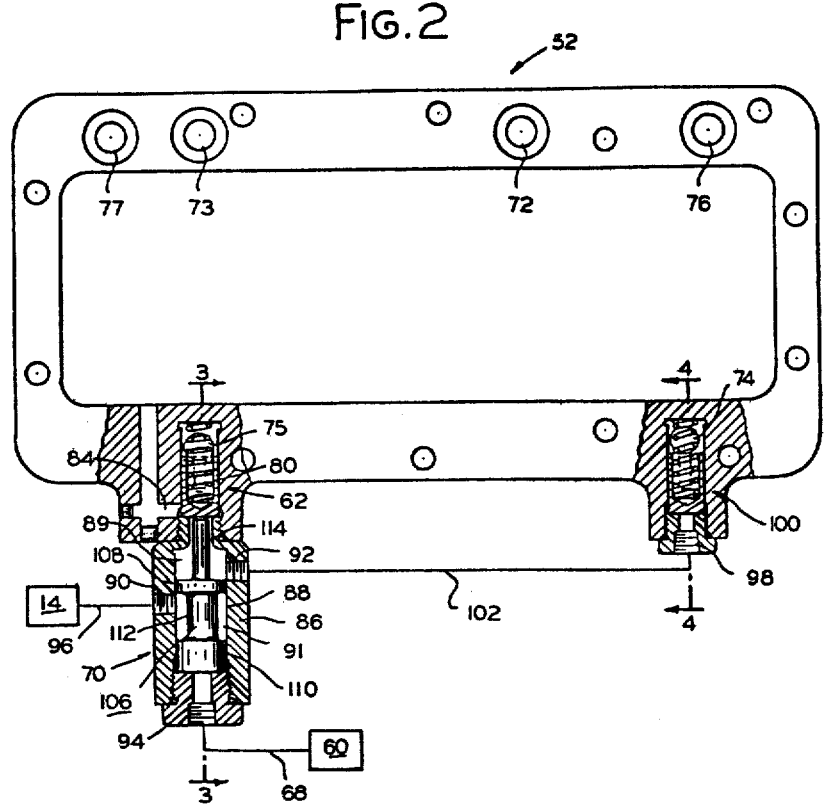
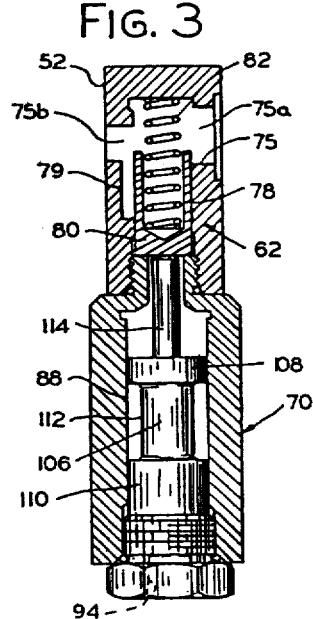
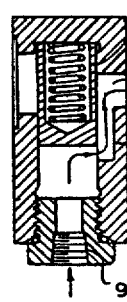
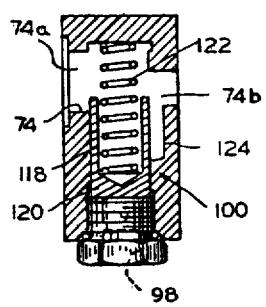

TRANSMISSION CONTROL SYSTEM

This is a continuation, of application Ser. No. 779,445, filed Mar. 21, 1977 now abandoned.

BACKGROUND OF THE INVENTION

1. Field of the Invention

The field of art to which this invention pertains includes pressurized fluid control systems for multiple speed ratio powershift transmissions. More particularly, the control system is adapted to automatically shift the transmission one step from a higher speed ratio to a lower speed ratio at a first predetermined vehicle ground speed and thereafter shift back to said higher speed ratio at a second higher predetermined vehicle ground speed.

2. Description of the Prior Art

In front end loader applications, for example, during bucket loading at the pile portion of the work cycle, the vehicle is required to crowd the pile as well as pry or lift with the bucket. The pile is normally approached in second gear from a travel portion of the work cycle, with initial crowding and bucket work being done in second gear. During the second gear operation, in comparison with first gear operation less torque is available at the driving wheels which has a desirable effect of minimizing wheel spin. However, when additional hydraulic demands are placed on the engine, as a result of prying or bucket lifting operations, insufficient power remains for transmission to the driving wheels for effectively crowding the pile. Therefore, at this time the operator normally must manually shift to first gear and upon loading the bucket and backing out of the pile, he must then manually shift to second gear.

In order to relieve the operator from excessive shifting between first and second gears, it would be very desirable to have an automatic shift system so that, when the vehicle ground speed drops to a first predetermined speed, the transmission is automatically downshifted from second to first gear which in turn is followed by an automatic upshift when the vehicle ground speed thereafter exceeds a second higher predetermined speed. Therefore, a principal object of this invention is to provide a transmission shift control system that provides this automatic function.

Detailed descriptions of the transmissions regulated by this type of a control system may be found in U.S. Pat. No. 3,126,752 to Bolster, with control covers and the associated valves to which this invention pertains being found in U.S. Pat. No. 3,334,703 to Zeller and in U.S. Pat. No. 3,559,780 to Erdman.

SUMMARY OF THE INVENTION

In order to meet the objective of having the transmission operate in second gear with the speed ratio control lever in the second gear location until ground speed drops to a first predetermined speed, whereupon the transmission automatically shifts back to first gear and remains in first gear until ground speed exceeds a second higher predetermined speed, at which time it automatically shifts back into second gear, the transmission control system is provided with an automatic downshift system. This downshift system includes an electronic speed sensing system in association with a downshift valve means wherein the former basically includes a signal generator for producing an electronic pulse signal proportional to vehicle road speed; an electronic speed switch, actuated via said signal generator for producing a continuous signal starting at a first predetermined vehicle road speed and terminating at a second higher predetermined vehicle road speed; and a solenoid valve, actuated via the continuous signal, for providing a pressure for actuating the downshift valve means.

The downshift valve means in turn includes a sandwich valve interposed between the transmission control cover and the transmission casing, with the sandwich valve including a plurality of bores that serve to channel pressurized fluid from the speed control valve to the several speed ratio clutches. First and second speed ratio clutch valves, associated with the sandwich valve, control the flow of pressurized fluid to first and second speed ratio clutches, respectively. An actuator-transfer valve both controls the closing of the second speed ratio clutch valve and the bypassing of the pressurized fluid from the second speed ratio clutch to the first speed ratio clutch, thus disengaging the second speed ratio clutch and engaging the first speed ratio clutch and thereby automatically shifting the transmission from a second speed ratio to a lower first speed ratio.

Thus automatic downshift continues until the vehicle ground speed exceeds a second predetermined speed, higher than the first speed in order to minimize the repeated shifting between the first and second speed ratios. At this time the signal is removed from the electronic speed switch thereby deactivating the solenoid valve and in turn shutting off the flow of second speed ratio clutch pressure into the first clutch valve while at the same time re-engaging the second speed ratio clutch thereby affecting a transmission upshift.

The features and advantages of the present invention will be more readily understood by persons skilled in the art when following the detailed description in conjunction with the several drawings.

BRIEF DESCRIPTION OF THE DRAWINGS

FIG. 2 is a top plan view of the sandwich valve of the transmission control system, with portions thereof being broken away for the sake of clarity.

FIG. 3 is an enlarged sectional view, taken along line 3—3 of a valve embodied in the control system.

FIG. 4 is an enlarged sectional view, taken along line 4—4 of FIG. 2, of a further valve embodied in the control system, with the valve spool being in the open or unshifted position.

FIG. 5 shows the valve of FIG. 4 with the valve spool being in the closed or shifted position.

DESCRIPTION OF THE PREFERRED EMBODIMENT

Figure 1:
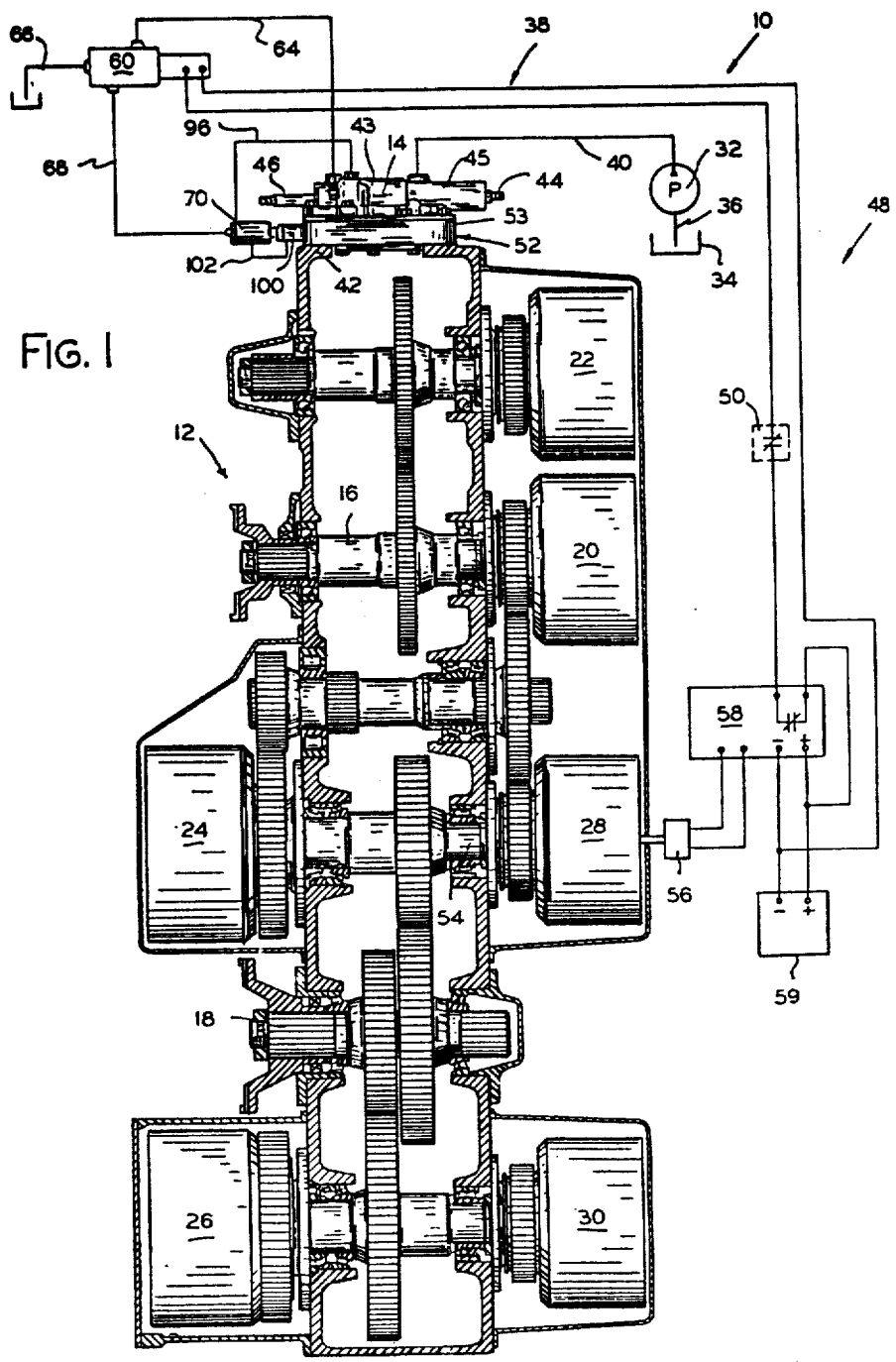
FIG. 1 shows diagrammatically and schematically the transmission control system of this invention in conjunction with a multiple speed ratio powershift transmission.

Referring now to the drawings, specifically to FIG. 1, there is shown a transmission control system 10 in combination with a multiple speed ratio powershift transmission 12 and its associated transmission control cover 14.

Transmission 12 includes an input shaft 16, an output shaft 18, a fluid operated directional control clutch 20 which conditions the transmission for forward drive when engaged, and a fluid operated directional control clutch 22 which conditions the transmission for reverse drive when engaged. In addition, a plurality of fluid operated speed ratio clutches 24, 26, 28, and 30, when engaged, condition the transmission for drive in first, second, third, and fourth speed ratios, respectively. A more detailed description of a transmission of this type may be found in U.S. Pat. No. 3,126,752 issued in the name of R. H. Bolster on Mar. 31, 1964.

Control cover 14 has a plurality of valves housed therein which among others generally include a conventional pressure regulating valve for limiting the maximum pressure in the control system, a conventional directional control valve 45, and a conventional speed control valve 43. These valves control the flow of pressurized fluid that operates the various fluid actuated clutches and lubricates the gears and bearings associated with transmission 12 in a manner well known in the art. More detailed showings of similar transmission control covers and their associated valves may be found in U.S. Pat. No. 3,334,703 to Zeller and in U.S. Pat. No. 3,559,780 to Erdman. A prime mover (not shown) is used to drive one or more charge or auxiliary pumps of any well known construction, one of which is schematically shown at 32. In order to selectively pressurize control cover 14, pump 32 draws and pressurizes fluid from a fluid supply reservoir or sump 34 from which fluid is drawn through a conduit 36, which conduit 40 linking pump 32 with control cover 14.

Transmission 12 is often used in the drive lines of construction machinery, a specific example thereof being front end loader applications, with the speed control shifting and the directional control shifting being performed by the operator generally through manual hand control levers (not shown) connected with speed control valve lever 44 and directional control valve lever 46, respectively, in control cover 14. In front end loader operation, for example, the operator is generally occupied with manually hand-manipulating both steering and hydraulic bucket control functions, and, therefore, it is inconvenient for him to have to manually hand shift back and forth between first and second gears, for example, in addition to hand shifting between the forward and reverse during a loading-unloading operation. It should, of course, be recognized that in front end loader operation, there is extensive short duration reciprocation of the front end loader in conjunction with the loading and unloading operations.

In order to relieve the operator from constantly shifting between first and second gears, when speed control lever 44 is in second gear location, transmission control system 10 allows transmission 12 to operate in second gear until ground speed drops to a first predetermined speed whereupon transmission 12 automatically shifts back to first gear and stays in first gear until ground speed exceeds a second higher predetermined speed, at which time it automatically shifts back into second gear.

In order to accomplish this objective, transmission control system 10 is provided with an automatic shift system 38, the best mode of which includes an electronic speed sensing system 48 in association with a downshift valve means 52 which in turn is interposed between transmission control cover 14 and electronic transmission casing 42. Electronic speed sensing system 48 basically includes a signal generator 56, an electronic speed switch 58 and a solenoid valve 60. Signal generator 56 is mounted on transmission first clutch shaft 54, with the latter being drivingly connected to the output shaft and therefore rotating at a speed proportional to road speed. Signal generator 56, which produces an electronic pulse signal proportional to road speed, may take the form of a model ESG signal generator (style ESGO) manufactured by Synchro-Start Products, Inc. of Skokie, Ill. Signal generator 56 in turn is electrically connected to an electronic speed switch 58 which may consist of a model ESSB-1AT electronic speed switch also manufactured by Synchro-Start Products, Inc. of Skokie, Ill. Electronic speed switch 58 is also electrically connected to both a DC power supply 59 and a solenoid valve 60 which may take the form of Model No. 8-3A-3-24 Solenoid Valve manufactured by Fluid Power Systems Division of AMBAC Industries, Inc. of Wheeling, Ill.

Solenoid valve 60 is also hydraulically interconnected with control cover 14 via conduit 64, as well as having a vent conduit 66 and being further hydraulically interconnected with a second speed clutch valve 62 (FIG. 2) in valve means 52 via conduit 68 and piston-cylinder actuator-transfer valve 70.

As previously noted, control cover 14 serves to control the hydraulic pressures for actuating the speed ratio and directional control clutches via speed control and directional control valves 43 and 45, respectively, with these valves forming no part of the present invention.

As best seen in FIG. 1, downshift valve means 52, which includes sandwich valve 53, is interposed between control cover 14 and transmission casing 42, with the actual structure of downshift valve means 52 being best seen in FIG. 2. Valve 53, which takes the form of a center-cored generally rectangular plate, includes a plurality of bores or apertures that serve to channel hydraulic pressure to the various clutches, with apertures 72, 73 permitting hydraulic interconnection with forward and reverse clutches 20, 22, respectively. Similarly, apertures 74, 75, 76, and 77 are hydraulically interconnected with first, second, third, and fourth speed ratio clutches 24, 26, 28, and 30, respectively. It should be understood that apertures 72–77 are connected with appropriate portions of valves 43 and/or 45 and via hydraulic lines (not shown) with their respective clutches in a manner well known in the art.

FIGS. 2 and 3 show second speed clutch valve 62 slidably mounted within bore 78 of sandwich valve 53, with bore 78 intersecting bore 75. Slidably disposed in bore 78 is a spool 80 which is normally biased to the position shown by means of the helical spring 82 and is movable, in a position opposing the biasing of spring 82, by means of piston and cylinder type fluid actuator valve 70. The portion of bore 78 remote from bore 75 is also connected to a vent conduit 84. Valve bore 78 includes a relieved portion 79 which allows the venting of the residual fluid pressure within aperture exit portion 75b via vent conduit 84 while spool 80 closes aperture entrance portion 75a. Actuator-transfer valve 70 is threaded into a portion of bore 78 and includes a body 86 having a longitudinally extending bore 88 therein. Communicating with bore 88 are longitudinally spaced ports 90 and 92, as well as end port 94. Port 90 of valve 70 is connected to the second speed ratio clutch pressure supply in control cover 14 by means of conduit 96, while port 92 is connected to port 98 of a first speed clutch valve 100 via conduit 102. Conduit 68 connects port 94 with solenoid valve 60.

Slidably disposed in valve bore 88 is a spool 106 whose spaced land portions 108, 110 define a groove 112 which serves to selectively interconnect ports 90 and 92 upon the movement of spool 106 in response to a control pressure from solenoid valve 60. Land portion 108 also serves to separate portions 89 and 91 of valve bore 88 when spool 106 is in the position shown in FIGS. 2 and 3. In addition, spool 106 includes a stalk portion 114 which abuts and serves to move spool 80 in opposition to spring 82. It should be understood that the interconnection of conduits 90 and 92, via the movement of spool 106, simultaneously closes second speed aperture 75 in sandwich valve 53 to fluid flow from control cover 14, thereby shutting off the flow of pressurized fluid to second speed ratio clutch 26 and consequently disengaging same.

The structure of first speed clutch valve 100 is substantially similar to that of second speed clutch valve 62 and includes a spool 120 reciprocable in bore 118 of sandwich valve 53, with bore 118 perpendicularly intersecting bore 74. Spool 120 is normally biased to the position shown by means of helical spring 122 and is movable in opposition thereto as a result of fluid pressure from second speed clutch valve 62 which enters through conduit 102 and port 98. Valve bore 118 also includes a relieved portion 124 which allows fluid pressure to enter aperture exit portion 74b while spool 120 closes aperture entrance portion 74a to direct fluid flow from control cover 14, as shown in FIG. 5, thereby consequently engaging first speed ratio clutch 24 via the pressurized fluid that normally actuates second speed ratio clutch 26.

In normal second speed ratio operation, pressurized fluid for second speed ratio clutch 26 passes vertically through aperture 75 of sandwich valve 53. In addition to being controlled by speed control valve 43, the second ratio clutch pressure is also controlled by actuator valve 70 and second speed clutch valve 62. Actuator-transfer valve 70 in turn is, of course, controlled by solenoid valve 60 which in turn is hydraulically interconnected with speed control valve 43 only in the second speed ratio setting. Once vehicle ground speed drops to a first predetermined speed, for example, 1 mile per hour, this predetermined first speed is sensed by electronic speed switch 58 that supplies a signal which activates solenoid valve 60. Actuation of valve 60 permits a control pressure from control cover 14 to reciprocate valve 70 and second speed clutch valve 62. As previously noted, clutch valve spool 80 shuts off a flow of pressurized fluid to second speed ratio clutch 26 whereas the movement of actuator valve spool 106 channels the second clutch valve pressure in conduit 96 into the previously unpressurized first speed clutch valve 100. As best seen in FIG. 5, first speed clutch valve spool 120 closes off aperture portion 74a of first speed aperture 74, thereby blocking off communication with the control cover while simultaneously permitting the pressurized fluid from valve 70 to enter aperture portion 74b which thereafter engages first speed ratio clutch 24. Thus, second speed ratio clutch pressure is used to activate first speed ratio clutch 24 and effect a downshift.

When the vehicle ground speed exceeds a second higher predetermined speed, for example, 2½ miles per hour, a signal is removed from electronic speed switch 58 to deactivate solenoid valve 60, thereby cutting off the flow of second speed ratio clutch pressure into first clutch valve 100 and at the same time, opening second speed ratio aperture 75 so as to permit engagement of second speed ratio clutch 26 which effects an upshift. The downshift and consequent upshift are fully automatic and completely free the operator from the burden of manual control in regard thereto. It should be understood that electronic speed switch 58 can be set for varying first and second predetermined ground speeds. Furthermore, automatic shift system 38 can, of course, also be utilized with other than only first and second speed ratios if so desired although only a one step shift can be accomplished. In addition, if desired by the operator, shift system 38 can be disconnected via override switch 50 preferably located in the vehicle cab.

From the foregoing, it is believed that those familiar with the art will readily recognize and appreciate the novel concepts and features of the present invention. Obviously, while the invention has been described in relation to only a limited number of embodiments, numerous variations, changes and substitutions of equivalents will present themselves to persons skilled in the art and may be made without necessarily departing from the scope and principles of this invention. As a result, the embodiments described herein are subject to various modifications, changes and the like, without departing from the scope and spirit of the invention, with the scope thereof being determined solely by reference to the claims appended hereto.

What is claimed is:

1. In a transmission control system for a vehicle including a multiple speed ratio power shift transmission having a plurality of fluid pressure operated clutches, adapted to establish torque ratio changes, a source of pressurized fluid, a speed control cover including manually-actuated control means and a speed control valve, for controlling the flow of fluid to said clutches, wherein the improvement comprises an electronic speed sensing system and downshift valve means, for automatically shifting said transmission one step from a higher speed ratio to a lower speed ratio at a first predetermined ground speed by diverting the fluid for pressurizing a higher speed ratio clutch to a lower speed ratio clutch and automatically shifting said transmission said one step from said lower speed ratio back to said higher speed ratio at a second predetermined ground speed, differing from said first predetermined ground speed, by ceasing the diverting of said fluid, with the diverting of said fluid being possible only when the setting of said speed control valve corresponds with said higher speed ratio; said electronic speed sensing system including an electronic signal generator operatively connected with said transmission for producing an electronic pulse signal proportional to vehicle road speed, an electronic speed switch actuated via said electronic pulse signal for producing a continuous signal below a first predetermined vehicle road speed and terminating at a second higher predetermined vehicle road speed, and a solenoid valve actuated via said continuous signal from said electronic speed switch, said solenoid valve being hydraulically interconnected with said speed control cover only when the setting of said speed control valve corresponds with said higher speed ratio for providing a pressure for actuating at least a portion of said downshift valve means.

2. The improved transmission control system of claim 1 wherein said lower speed ratio clutch is the first speed ratio clutch and said higher speed ratio clutch is the second speed ratio clutch.

3. In a vehicle having a transmission with separate fluid operated clutches for selecting a plurality of speed ratios as well as forward and reverse drive, a transmission control system including a source of pressurized fluid, a speed control cover including manually-actuated control means with a speed control valve for controlling the flow of fluid to said clutches and an automatic downshift system comprising an electronic speed sensing system in combination with downshift valve means, a method for automatically downshifting said transmission for one step from a higher speed ratio to a lower speed ratio when the setting of said speed control valve corresponds with said higher speed ratio, and subsequently automatically upshifting said transmission one step, said method comprising the steps of:

a. producing an electronic pulse signal proportional to vehicle road speed;
b. producing a continuous signal below a first predetermined vehicle road speed;
c. actuating a solenoid valve, via said continuous signal, to provide an actuating pressure;
d. closing a higher speed ratio clutch valve via said actuating pressure thereby disconnecting said higher speed ratio clutch;
e. simultaneously diverting the fluid for pressurizing said higher speed ratio clutch valve to a lower speed ratio clutch valve;
f. pressurizing said lower speed ratio clutch thereby effectively shifting said transmission said one step from said higher to said lower speed ratio;
g. terminating said continuous signal at a second higher predetermined road speed;
h. deactivating said solenoid valve thereby discontinuing said actuating pressure;
i. opening said higher speed ratio clutch valve while simultaneously ceasing diverting of said pressurized fluid from said higher speed ratio clutch to said lower speed ratio clutch thereby disconnecting said lower speed ratio clutch; and
j. pressurizing said high speed ratio clutch thereby effectively shifting said transmission said one step from said lower to said higher speed ratio.

4. In a transmission control system for a vehicle including a multiple speed ratio power shift transmission having a plurality of fluid pressure operated clutches, adapted to establish torque ratio changes, a source of pressurized fluid, a speed control cover including manually-actuated control means and a speed control valve, for controlling the flow of fluid to said clutches, wherein the improvement comprises an electronic speed sensing system and downshift valve means, for automatically shifting said transmission one step from a higher speed ratio to a lower speed ratio at a first predetermined ground speed by diverting the fluid for pressurizing a higher speed ratio clutch to a lower speed ratio clutch and automatically shifting said transmission said one step from said lower speed ratio back to said higher speed ratio at a second predetermined ground speed, differing from said first predetermined ground speed, by ceasing the diverting of said fluid, with the diverting of said fluid being possible only when the setting of said speed control valve corresponds with said higher speed ratio; said electronic speed sensing system including an electronic signal generator operatively connected with said transmission for producing an electronic pulse signal proportional to vehicle road speed, an electronic speed switch actuated via said electronic pulse signal for producing a continuous signal below a first predetermined vehicle road speed and terminating at a second higher predetermined vehicle road speed, and a solenoid valve actuated via said continuous signal from said electronic speed switch, said solenoid valve being hydraulically interconnected with said speed control cover only when the setting of said speed control valve corresponds with said higher speed ratio for providing a pressure for actuating at least a portion of said downshift valve means; and said downshift valve means including a sandwich valve interposed between said manually actuated control means and said transmission, said sandwich valve including first and second bores that serve to channel pressurized fluid from said speed control valve to said lower and higher speed ratio clutches, respectively, said sandwich valve further including third and fourth bores intersecting said first and second bores, respectively, a higher speed ratio clutch valve associated with said fourth bore for selectively closing off an entrance portion of said second bore, thereby interrupting the flow of pressurized fluid to said higher speed ratio clutch, means for actuating said higher speed ratio clutch valve to closed position, said actuating means being hydraulically interconnected with and controlled by said solenoid valve, and a lower speed ratio clutch valve associated with said third bore for selectively closing off an entrance portion of said first bore, while simultaneously selectively opening an exit portion of said first bore to said third bore.

5. The improved transmission control system of claim 4 wherein said downshift valve means further includes:

a. transfer valve means including a spool portion;
b. first conduit means for hydraulically connecting said speed control valve with a first portion of said transfer valve means, independent of said sandwich valve second bore, for supplying fluid for pressurizing said higher speed ratio clutch into said transfer valve means; and
c. second conduit means for hydraulically connecting a transfer valve means second portion, separable from said transfer valve means first portion via said spool portion, with said lower speed ratio clutch valve, said transfer valve means being hydraulically interconnected with and controlled by said solenoid valve, whereby during the duration of said continuous signal, said solenoid valve is actuated thereby closing off said higher speed ratio clutch valve and consequently disengaging said higher ratio clutch, via said actuating means, and simultaneously connecting said first and second conduit means thereby causing said lower speed ratio clutch valve to simultaneously close off said first bore entrance portion and open said first bore exit portion to permit the fluid for pressurizing said higher speed ratio clutch to pressurize said lower speed ratio clutch and thereby automatically shifting said transmission said one step from said higher speed ratio to said lower speed ratio.

6. For use with a vehicle having a transmission with separate fluid operated clutches for selecting a plurality of speed ratios, a transmission control system including a source of pressurized fluid, a transmission control cover with a speed control valve for controlling the flow of fluid to said speed ratio clutches wherein the improvement takes the form of a transmission automatic downshift system comprising an electronic speed sensing system in combination with downshift valve means for automatically shifting said transmission one step, which said speed control valve is set for a second speed ratio, to a lower first speed ratio, at a first predetermined ground speed by diverting pressurized fluid from a second speed ratio clutch to a first speed ratio clutch and thereafter, at a second higher predetermined ground speed, automatically shifting said transmission said one step back to said second speed ratio by ceasing the diverting of said fluid, with the diverting of said fluid being possible only while said speed control valve is set for said second speed ratio; and said electronic speed sensing system including an electronic signal generator operatively connected with said transmission for producing an electronic pulse signal proportional to vehicle road speed, an electronic speed switch actuated via said signal generator for producing a continuous signal below said first predetermined vehicle road speed and terminating at said second higher predetermined vehicle road speed, and a solenoid valve actuated via said signal from said electronic speed switch, said solenoid valve being hydraulically interconnected with said control cover only in said second speed ratio for providing a pressure for actuating said downshift valve means.

7. The transmission automatic downshift system of claim 6 wherein said downshift valve means includes:
   a. a sandwich valve interposed between said control cover and said transmission, said sandwich valve including first and second bores that serve to channel pressurized fluid from said speed control valve to said first and second speed ratio clutches, respectively, said sandwich valve further including third and fourth bores intersecting said first and second bores, respectively;
   b. a normally open second speed ratio clutch valve associated with said fourth bore for selectively closing off an entrance portion of said second bore, thereby interrupting the flow of pressurized fluid to said second speed ratio clutch; and
   c. a normally open first speed ratio clutch valve associated with said third bore for selectively closing off an entrance portion of said first bore, while simultaneously selectively opening an exit portion of said first bore to said third bore.

8. The transmission automatic downshift system of claim 7 wherein said downshift valve means further includes:
   a. actuator and transfer valve means including an actuating portion and a spool portion, the former serving for actuating said second speed ratio clutch valve to closed position;
   b. first conduit means for hydraulically interconnecting said speed control valve with a first portion of said actuator and transfer valve means, independent of said sandwich valve second bore, for supplying fluid for pressurizing said second speed ratio clutch into said actuator-transfer valve means; and
   c. second conduit means for hydraulically interconnecting a second portion of said actuator-transfer valve means, separable from a first portion of said actuator-transfer valve means via said spool portion, with said first speed ratio clutch valve, said actuator-transfer valve being hydraulically interconnected with and controlled by said solenoid valve means, whereby during the duration of said continuous signal, said solenoid valve is actuated thereby closing off said second speed ratio clutch valve and simultaneously connecting said first and second conduit means thereby causing said first speed ratio clutch valve to simultaneously close off said first bore entrance portion and open said first bore exit portion to permit the pressurizing of said first speed ratio clutch and thereby automatically shifting said transmission from said second speed ratio to said first speed ratio.

9. For use with a vehicle having a transmission with separate fluid operated clutches for selecting a plurality of speed ratios, a transmission control system including a source of pressurized fluid, a transmission control cover with a speed control valve for controlling the flow of fluid to said speed ratio clutches wherein the improvement takes the form of a transmission automatic downshift system comprising a speed sensing system in combination with downshift valve means for automatically shifting said transmission one step, while said speed control valve is set for a second speed ratio, to a lower first speed ratio, at a first predetermined ground speed by diverting pressurized fluid from a second speed ratio clutch to a first speed ratio clutch and thereafter, at a second higher predetermined ground speed, automatically shifting said transmission said one step back to said second speed ratio by ceasing the diverting of said fluid, with the diverting of said fluid being possible only while said speed control valve is set for said second speed ratio; and said speed sensing system including a signal generator operatively connected with said transmission for producing a signal proportional to vehicle road speed, a speed switch actuated via said signal generator for producing a continuous signal below said first predetermined vehicle road speed and terminating at said second higher predetermined vehicle road speed, and means for providing a pressure for actuating said downshift valve means, said pressure means actuated via said signal from said speed switch and hydraulically interconnected with said control cover only in said second speed ratio.

10. The transmission automatic downshift system of claim 9 wherein said downshift valve means includes:
   a. a sandwich valve interposed between said control cover and said transmission, said sandwich valve including first and second bores that serve to channel pressurized fluid from said speed control valve to said first and second speed ratio clutches, respectively, said sandwich valve further including third and fourth bores intersecting said first and second bores, respectively;
   b. a normally open second speed ratio clutch valve associated with said fourth bore for selectively closing off an entrance portion of said second bore, thereby interrupting the flow of pressurized fluid to said second speed ratio clutch; and
   c. a normally open first speed ratio clutch valve associated with said third bore for selectively closing off an entrance portion of said first bore, while simultaneously selectively opening an exit portion of said first bore to said third bore.

11. The transmission automatic downshift system of claim 10 wherein said downshift valve means further includes:
   a. actuator and transfer valve means including an actuating portion and a spool portion, the former serving for actuating said second speed ratio clutch valve to closed position;
   b. first conduit means for hydraulically interconnecting said speed control valve with a first portion of said actuator and transfer valve means, independent of said sandwich valve second bore, for supplying fluid for pressurizing said second speed ratio clutch into said actuator-transfer valve means; and
   c. second conduit means for hydraulically interconnecting a second portion of said actuator-transfer valve means, separable from a first portion of said actuator-transfer valve means via said spool portion, with said first speed ratio clutch valve, said actuator-transfer valve means being hydraulically interconnected with and controlled by said pressure means whereby during the duration of said continuous signal, said pressure means is actuated thereby closing off said second speed ratio clutch valve and simultaneously connecting said first and second conduit means thereby causing said first speed ratio clutch valve to simultaneously close off said first bore entrance portion and open said first bore exit portion to permit the pressurizing of said first speed ratio clutch and thereby automatically shifting said transmission from said second speed ratio to said first speed ratio.

* * * * *